US012159776B2

(12) United States Patent
Smith

(10) Patent No.: US 12,159,776 B2
(45) Date of Patent: Dec. 3, 2024

(54) QUADRUPOLE MASS SPECTROMETER DATA TO ENABLE NEW HARDWARE OPERATING REGIMES

(71) Applicant: THERMO FINNIGAN LLC, San Jose, CA (US)

(72) Inventor: Johnathan W. Smith, Round Rock, TX (US)

(73) Assignee: THERMO FINNIGAN LLC, San Jose, CA (US)

( * ) Notice: Subject to any disclaimer, the term of this patent is extended or adjusted under 35 U.S.C. 154(b) by 360 days.

(21) Appl. No.: 17/730,642

(22) Filed: Apr. 27, 2022

(65) Prior Publication Data

US 2023/0352287 A1 Nov. 2, 2023

(51) Int. Cl.
*H01J 49/00* (2006.01)

(52) U.S. Cl.
CPC ................................ *H01J 49/0036* (2013.01)

(58) Field of Classification Search
None
See application file for complete search history.

(56) References Cited

U.S. PATENT DOCUMENTS 7,078,686 B2 7/2006 Roushall et al.
7,633,059 B2 * 12/2009 Russ, IV ............... H01J 49/004 250/281
8,658,971 B2 2/2014 Green et al.
9,337,009 B2 5/2016 Grothe, Jr.
11,270,874 B2 3/2022 Smith et al.
2006/0255258 A1 11/2006 Wang et al.
2022/0013343 A1 1/2022 Boskamp

OTHER PUBLICATIONS

Slomp et al. "Low-cost, high-performance quadrupole mass spectrometer based on a low-performance rf generator" Review of Scientific Instruments, 1986, vol. 57, No. 11, pp. 2786-2790.
Race, Alan M. "Investigation and Interpretation of Large Mass Spectrometry Imaging Datasets" a thesis submitted University of Burmingham for the degree of Doctor of Philosophy, 2016, 189 pages.
Listgarten et al. "Statistical and Computational Methods for Comparative Proteomic Profiling Using Liquid Chromatography-Tandem Mass Spectrometry" Molecular & Cellular Proteomics, Apr. 2005, vol. 4, Issue 4, pp. 419-434.

* cited by examiner

*Primary Examiner* — Walter L Lindsay, Jr.
*Assistant Examiner* — Geoffrey T Evans
(74) *Attorney, Agent, or Firm* — Michael Best & Friedrich LLP

(57) ABSTRACT

Disclosed herein are systems and methods for a mass spectrometer having a multipole configured to pass an ion stream, and a detector configured to detect the properties of the abundance of ions represented by data points. The mass spectrometer also includes a processing system that is configured to obtain a plurality of paired data points (e.g., detector data points and RF amplitude data points), and identify, based on centroiding a portion of the plurality of paired data points, at least one characteristic of a peak and determine, based on the at least one characteristic of the peak, a preferred peak shape.

24 Claims, 5 Drawing Sheets

QUADRUPOLE MASS SPECTROMETER DATA TO ENABLE NEW HARDWARE OPERATING REGIMES

FIELD

The present disclosure generally relates to the field of mass spectrometry including systems and methods for improving mass spectrometer data.

BACKGROUND

Quadrupole mass analyzers are one type of mass analyzer used in mass spectrometry. As the name implies, a quadrupole consists of four rods, usually cylindrical or hyperbolic, set-in parallel pairs to each other, as for example, a vertical pair and a horizontal pair. These four rods are responsible for selecting sample ions based on their mass-to-charge ratio (m/z) as ions are passed down the path created by the four rods. Ions are generally separated in a quadrupole mass filter based on the stability of their trajectories within the quadrupolar oscillating and DC fields. Each opposing rod pair is connected together electrically, and a radio frequency (RF) voltage with a DC offset voltage is applied between one pair of rods and the other. Ions travel down the quadrupole between the rods. Only ions of a certain mass-to-charge ratio will be able to pass through the rods and reach the detector for a given ratio of voltages applied to the rods. Other ions have unstable trajectories and will collide with the rods. This permits selection of an ion with a particular m/z or allows the operator to scan for a range of m/z-values by continuously varying the applied DC and RF voltages.

Traditionally mass spectrometers that utilize resolving quadrupoles for acquiring full scan spectra have assigned masses to the various peaks in the spectra through various methods of getting centroids of the peaks in the spectra. These centroid values can then be converted into mass by taking consideration of the starting mass, scan rate, and the total runtime from the point the scan started that a centroid was assigned. This traditional method requires a large number of rigorous and expensive hardware requirements in order to produce accurate mass and intensity data. Thus, an improved method is needed, and discussed herein, that can make previously unusably bad spectra into satisfactory data.

SUMMARY

In a first aspect, a mass spectrometer support apparatus may include a processor, a non-transitory computer readable medium storing instructions that cause the processor to perform a series of actions. The first action being obtaining a plurality of paired data points comprising detector data points and RF amplitude data points, each detector data point being paired with an RF amplitude data point. Once the plurality of paired data points are captured and centroided, at least characteristic of a peak is identified. Based on the at least one characteristic of the peak, a preferred peak shape is determined. The processor can then calculate, based on centroiding another portion of the plurality of paired data points, a change in peak shape and identify, based on the plurality of paired data points and the change in peak shape, a plurality of accurate data pairs.

In a second aspect, a method associated a mass spectrometer support apparatus may include, obtaining a plurality of paired data points comprising detector data points and RF amplitude data points, each detector data point being paired with an RF amplitude data point. Then, identifying, based on centroiding a portion of the plurality of paired data points, at least one characteristic of a peak. The method may further determine, based on the at least one characteristic of the peak, a preferred peak shape. A change in peak shape can them be calculated based on centroiding another portion of the plurality of paired data points. Finally, a plurality of accurate data pairs can be identified based on the plurality of paired data points and the change in peak shape.

In a third aspect, a mass spectrometer may include a multipole configured to pass an ion stream, the ion stream comprising an abundance of one or more ion species within stability boundaries defined by (a, q) values. It may also include a detector configured to detect properties of the abundance of ions represented by data points, and a processing system. The processing system being configured to obtain a plurality of paired data points comprising detector data points and RF amplitude data points, each detector data point being paired with an RF amplitude data point. The processing system further configured to identify, based on centroiding a portion of the plurality of paired data points, at least one characteristic of a peak and determine, based on the at least one characteristic of the peak, a preferred peak shape. The processing system may be further configured to calculate, based on centroiding another portion of the plurality of paired data points, a change in peak shape and identify, based on the plurality of paired data points and the change in peak shape, a plurality of accurate data pairs.

DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
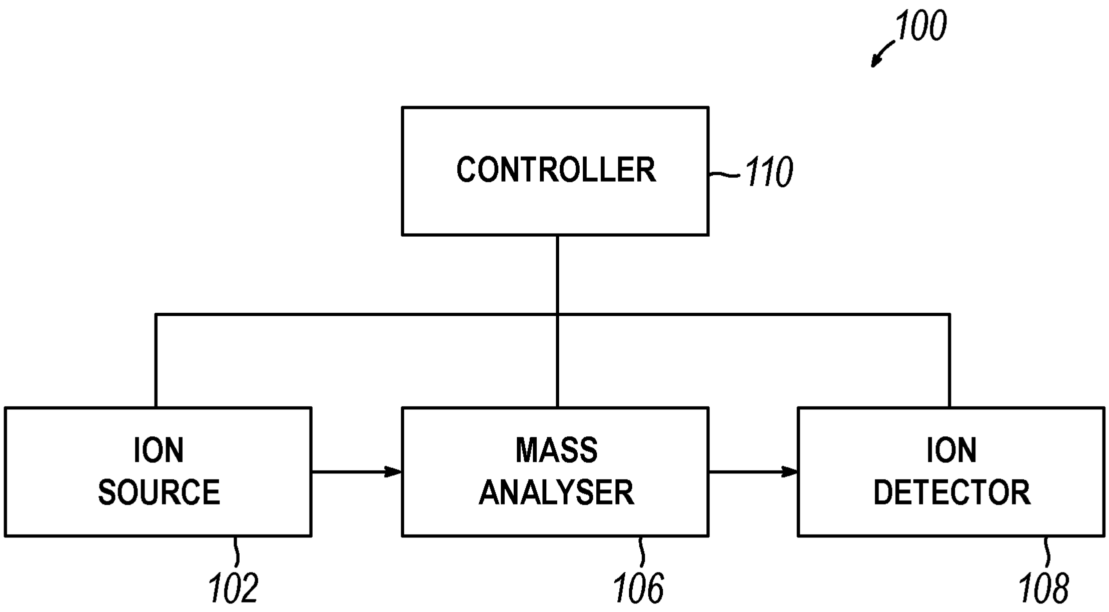
FIG. 1 is a block diagram of an exemplary mass spectrometry system, in accordance with various embodiments.

Disclosed herein are mass spectrometry systems, as well as related methods, computing devices, and computer-readable media. The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

The mass spectrometry embodiments disclosed herein may achieve improved performance relative to conventional approaches. In various embodiments, traditional quadrupole-based mass spectrometer data has required that the data be split apart and each mass to charge peak integrated and then assigned a single mass, often referred to as centroiding. Centroiding divides data up, integrates data around a single ion species, and assigns it all a single mass. Currently, multiple methodologies exist for this process, such as, for example, identifying valleys between the various ion species and/or identifying the values at a one or more peaks (e.g., high points) and then dividing data up or integrating a fixed amount of values following a peak or valley. However, this process can fail entirely if there are no valleys and/or the data contains integration errors (e.g., due to the peaks having a substantial tail). All of these problems and more are addressed by taking a new approach based on ion species sparsity to create a centroider.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). As used herein, "a" or "an" also may refer to "at least one" or "one or more." As used herein, and as commonly used in the art of mass spectrometry, the term "DC" does not specifically refer to or necessarily imply the flow of an electric current but, instead, refers to a non-oscillatory voltage which may be either constant or variable. The term "RF" refers to an oscillatory voltage or oscillatory voltage waveform for which the frequency of oscillation is in the radio-frequency range. Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device or collection of devices. The drawings are not necessarily to scale.

I. Mass Spectrometry and the Mathieu Stability Diagram

Various embodiments of mass spectrometer platform 100 can include components as displayed in the block diagram of FIG. 1. In an embodiment, elements of FIG. 1 may be incorporated into mass spectrometer platform 100. According to various embodiments, mass spectrometer platform 100 can include an ion source 102, a mass analyzer 106, an ion detector 108, and a controller 110. In some embodiments, and as discussed herein, the ion source 102 generates a plurality of ions from a sample. The ion source can include, but is not limited to, an electron ionization (EI) source, a chemical ionization (CI) source, and the like.

In a further embodiment, the mass analyzer 106 may separate ions based on a mass-to-charge ratio of the ions. By way of non-limiting example, mass analyzer 106 may include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In some embodiments, the mass analyzer 106 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio. The mass analyzer 106 may also be a hybrid system incorporating one or more mass analyzers and mass separators coupled by various combinations of ion optics and storage devices. For example, a hybrid system may have a linear ion trap (LIT), a high energy collision dissociation device (HCD), an ion transport system, and a TOF.

In various embodiments, the ion detector 108 can detect ions. For example, the ion detector 108 may include an electron multiplier, a Faraday cup, or the like. In some embodiments, the ion detector may be quantitative, such that an accurate count of the ions can be determined. In other embodiments, such as with an electrostatic trap mass analyzer, the mass analyzer detects the ions, combining the properties of both the mass analyzer 106 and the ion detector 108 into one device.

In some embodiments, and as shown, the controller 110 may communicate with the ion source 102, the mass analyzer 106, and the ion detector 108. For example, controller 110 may configure the ion source 102 or enable/disable the ion source based on various factors. In an additional embodiment, the controller 110 may configure the mass analyzer 106 to select a particular mass range to detect. Further, the controller 110 can adjust the sensitivity of the ion detector 108, such as by adjusting the gain. Additionally, the controller 110 can adjust the polarity of the ion detector 108 based on the polarity of the ions being detected. For example, the ion detector 108 can be configured to detect positive ions or be configured to detected negative ions.

Figure 4:
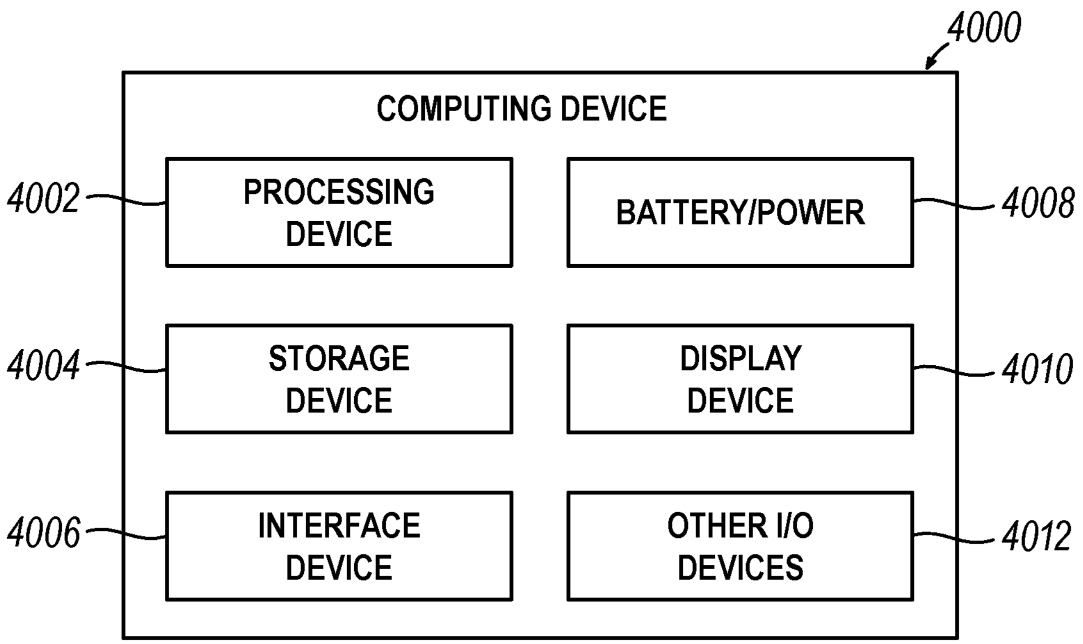
FIG. 4 is a block diagram of an example computing device that may perform some or all of the mass spectrometer support methods disclosed herein, in accordance with various embodiments.
Figure 5:
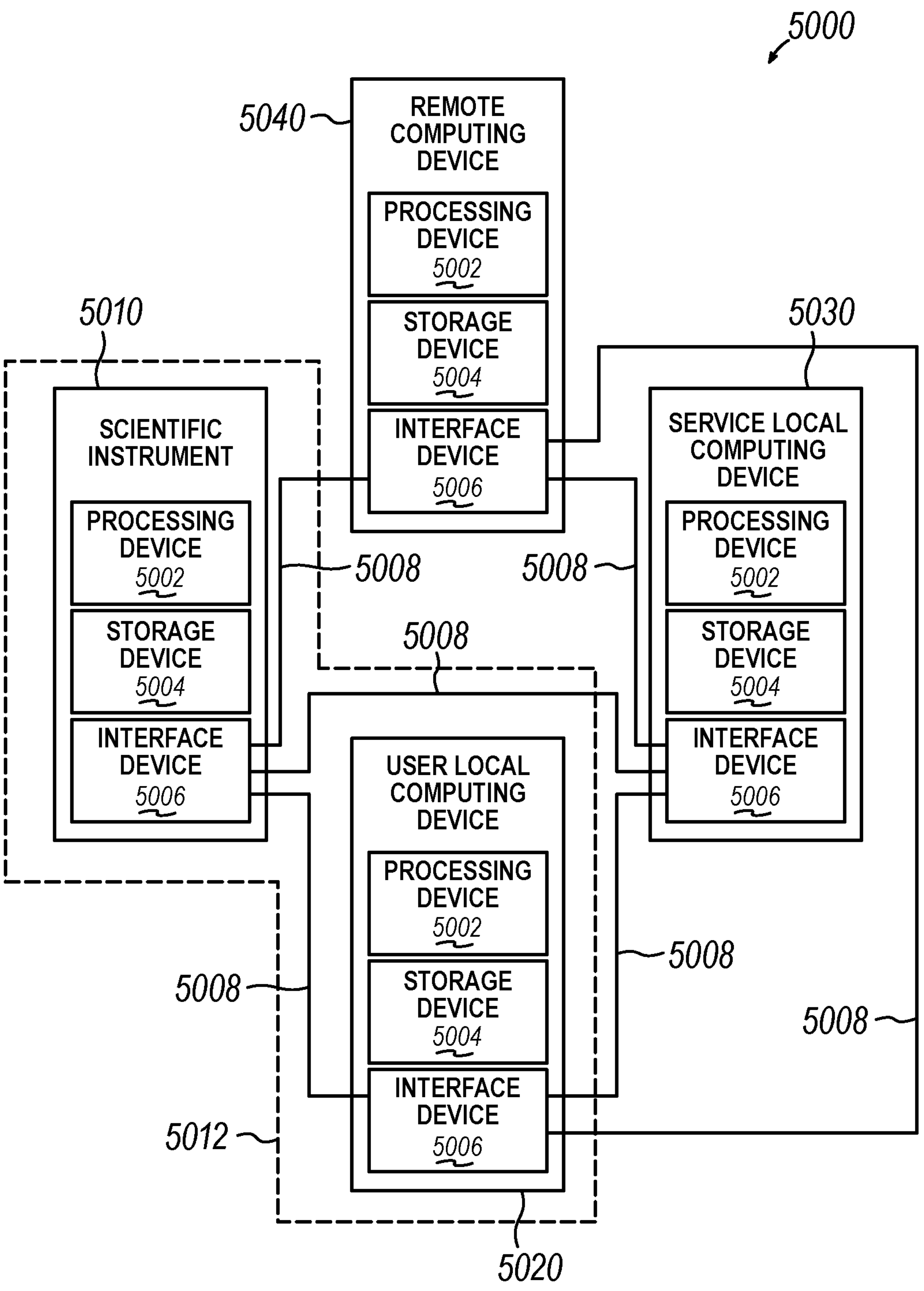
FIG. 5 is a block diagram of an example mass spectrometer support system in which some or all of the mass spectrometer support methods disclosed herein may be performed, in accordance with various embodiments.

Examples of computing devices that may, singly or in combination, implement the mass spectrometer platform 100 are discussed herein with reference to the computing device 4000 of FIG. 4, and examples of systems of interconnected computing devices, in which the mass spectrometer platform 100 may be implemented across one or more of the computing devices, is discussed herein with reference to the mass spectrometry support system 5000 of FIG. 5.

Scanning quadrupole mass spectrometers traditionally generate mass spectra by using a nearly constant RF/DC ratio whose RF and DC amplitudes are nearly linearly scaled in time. This process, as would be understood by one of ordinary skill in the art, essentially produces a shifting pass-band filter where different ranges of mass-to-charge (m/z) ions are stable and allowed to pass through a quadrupole and into a detector. This passband can be defined by the a and q values that are solutions to the Mathieu equation.

Figure 2:
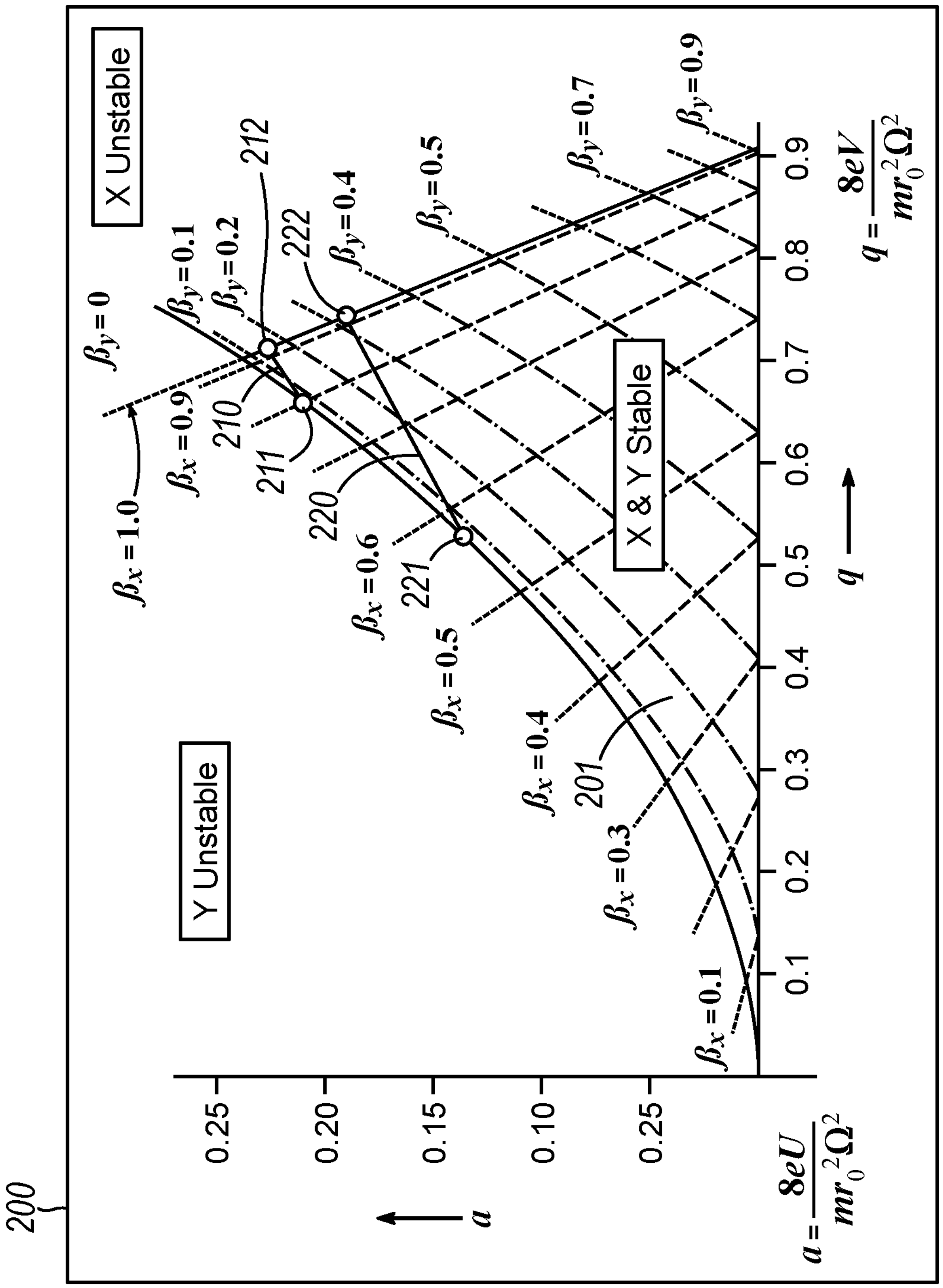
FIG. 2 is a graphical representation of the Mathieu equation, in accordance with various embodiments.

Referring to FIG. 2, a graphical representation of the Mathieu equation 200 is shown. In some embodiments, and as shown in FIG. 2, the 'a' term corresponds to the amplitude of the resolving DC field, which is given by Equation 1.

$$a = \frac{8U}{\left(\frac{m}{z}\right) r_0^2 \Omega^2} \quad \text{Equation 1}$$

In a further embodiment, the 'q' term corresponds to the amplitude of the RF field, which is given by Equation 2.

$$q = \frac{4V}{\left(\frac{m}{z}\right) r_0^2 \Omega^2} \quad \text{Equation 2}$$

The Mathieu equation can be expressed in terms of two unitless parameters, a and q. The general solution of the Mathieu equation, (i.e., whether or not an ion has a stable trajectory), depends only upon these two parameters. The trajectory for a particular ion also depends on a set of initial conditions (e.g., the ion's position and velocity as it enters the quadrupole and the RF phase of the quadrupole at that instant). As used herein, m/z denotes the ion's mass-to-charge ratio, U denotes the DC offset, and V denotes the RF amplitude, a is proportional to U/(m/z) and q is proportional to V/(m/z). The plane of (q, a) values can be partitioned into contiguous regions corresponding to bounded solutions and unbounded solutions.

As shown in the Mathieu quadrupole stability diagram of FIG. 2, two regions exist (i.e., the bounded region 201 and unbounded regions) in the q-a plane, The region containing bounded solutions 201 of the Mathieu equation is called the stability region. A stability region is formed by the intersection of two regions, corresponding to regions where the x- and y-components of the trajectory are stable respectively. In some embodiments, there may be multiple stability regions, but conventional instruments generally only involve a single principal stability region. In one embodiment, and as shown, the principal stability region 201 has a vertex 202 at the origin of the q-a plane.

For an ion to pass through the stable region, it must be stable in both the X and Y dimensions simultaneously. The Y iso-beta lines (βy), as shown in FIG. 2, tend toward zero at the tip of the stability diagram and the X iso-beta lines (βx) tend toward 1.0. As discussed herein, ions with different m/z values map onto different lines (e.g., 210 and 220) in the stability diagram. Ion movement with respect to the Mathieu stability diagram 200 is unstable in the y-direction before entering the stability region but as the ion enters a first boundary (e.g., 211 and 221) of the stability diagram, it becomes critically stable, with relatively large oscillations of high amplitude and low frequency in the y-direction that tend to decrease over time. As the ion exits the stability diagram as shown by the boundary region (e.g., 212 and 222), it becomes unstable in the x-direction, and so the oscillations in the x-direction tend to increase over time, with relatively large oscillations in x just before exiting. If the scan line is operated in either the y-unstable region or the x-unstable region, ions not bounded within the stability diagram discharge against the electrodes and are not detected. In an embodiment where two ions are stable at the same time, the heavier ion (i.e., the one entering the stability diagram later) generally has larger y-oscillations and the lighter ion has larger x-oscillations.

Thus, in some embodiments, ions may be manipulated by a quadrupole and induced to perform an oscillatory motion (i.e., an ion dance) on the detector cross section as it passes through the stability region. Generally, each ion performs a similar oscillatory motion at the same "a" and "q" values but has different RF and DC voltages at different times. In further embodiments, and as shown in FIG. 2, the lines (e.g., 210 and 220) crossed the DC stability boundary much slower than the RF stability boundary.

Accordingly, as discussed above, and as would be understood by one of ordinary skill in the art operation of a mass spectrometer requires a complex and detailed calibration (i.e., initial tune). Once calibrated, the mass spectrometry system's operational accuracy is then dependent on the RF/DC ratio being reliably reproduced to match what occurred during the tuning process. Additionally, in some embodiments, it may depend on having stable RF/DC ratios throughout a given scan. In an additional embodiment, if the RF amplitude does not match what was observed and recorded during system tuning/calibration the peak may have an incorrect width and appear at a different time in the spectra, which can lead to the mass assignment becoming skewed.

In addition to the above issue of the mass position being dependent upon the RF/DC ratio remaining as expected, the RF/DC ratio changing may also alter the transmission efficiency of a quadrupole mass filter. This may be especially true for lower cost round rod quadrupoles which may only pass 5% to 10% of ions when operated at unit resolution at masses of greater than 1000 atomic mass unit (amu), but with wider pass bands the transmission percentage could rise to over 50%.

II. System Improvements

As discussed herein, the primary goal of this disclosure is to improve the overall mass accuracy of quadrupole mass filter spectrums when operated in full scan mode and/or while operating in ranges previously thought to be useless for scanning quadrupole mass filters. To achieve that, the below described embodiments will moving away from the current mass spectrometer model that assumes precise replication of an RF/DC ratio that changes and scales over time in a precise manner to, ideally, reproduce exactly what occurred during a prior tune and/or calibration procedure. The improved embodiments described herein will instead rely upon an initial timing synchronization of a detector, an RF amplitude measurement, and subsequent synchronous measurements as well as some assumptions about transmission based on the Mathieu stability diagram.

As will be discussed in greater detail herein, the improvements of various embodiments may involve the system collecting and/or analyzing: (1) initial tune and calibration data associated with how measured RF amplitudes, and in some cases measured DC amplitudes, correspond to given calibration ions of known mass; (2) RF amplitude measurements that correspond to all detector acquisition times; (3) peak widths throughout each individual scan; and (4) measured resolution-transmission curves for the calibration masses.

A. Collection of Data Points

In some embodiments, and as discussed further herein, a first step to improve the function of a mass spectrometer involves changing how the detector data is collected and stored. As used herein, detector data means any data that is formed by ions passing through the quadrupole and striking the detector, which creates a signal, and that signal information is recorded. As described herein, various other information metrics are also captured, such as measurements of the RF amplitude and/or the DC voltage measurements. Current systems, rely on the assumption that the RF values changed linearly in time, such that the detector data values are simply a list of values that are linear in time. As discussed above, this can lead to errors as the actual measured peak may have an incorrect width and/or appear at a different time in the spectra than the calibration values, which can lead to the mass assignment becoming skewed.

Thus, in some embodiments, the system may collect and store the RF and/or DC values as a data pair with the associated detector data. The data pairs may match up each detector data piece with a corresponding measured RF amplitude and/or DC amplitude. In a further embodiment, the system may down sample the data pairs (e.g., detector data and the corresponding RF amplitude data) to a lower sample rate and constant RF amplitude spacing interval. It should be understood that any known or future technique may be utilized to down sample the data pairs. This process may be similar to how existing mass spectrometer information is down sampled before further processing and/or centroiding. One potential difference being that the new unprocessed data may not have constant interval spacing for the RF amplitude data.

In various embodiments, the system may utilize a fully digital RF closed loop control circuit. More specifically, some embodiments may utilize a direct digitization of an RF sine wave to avoid any delay or smoothing that rectification circuits inevitably add. However, in an embodiment where a legacy (e.g., non-digitally controlled, RF) system is being used, this process/step could just assume that the RF system is operationally ideal such that no wandering of the true RF amplitude occurs relative to what was expected. Thus, in a legacy embodiment, it may be useful for the RF component of the mass filter electric field to have substantially better control compared to the DC. By way of non-limiting example, if it is known that the RF amplitude settles much faster than the resolving DC field, the pre-scan time could be minimized.

In an additional or alternative embodiment, the system may utilize a high-speed accurate digital measurement device(s) to measure one or both of the DC and RF electric components as they exist on a quadrupole mass filter. In practice, it may be difficult to collect measurements from the DC component on the quadrupole mass filter. Specifically, when an RF voltage is applied and/or when the accurate measurement points are behind a low pass and/or band-stop filter. This is due to the fact that these filters may imposes a time shift between what the voltage truly is on the quadrupole mass filter and what is measured. Stated differently, if the DC signal is passed through a filter before being measured, the filter may delay the signal by a non-negligible amount of time, and thus time delay errors will be introduced into the measured DC amplitude.

Due to this potential time delay, some embodiments may function without requiring the exact resolving DC voltage. In those embodiments, the system may attempt to assign more accurate mass results using only the RF voltage measurement. The system may, in some embodiments, utilize a digital direct measurement of the RF voltage, such as disclosed U.S. Pat. No. 11,270,874, filed Mar. 30, 2020, and titled "Amplified Amplitude Digital Control for a Mass Spectrometer," the disclosure of which is incorporated herein by reference in its entirety.

In a further embodiment, the technique of doing mass correction based upon an RF measurement and scan-time data may be used in legacy systems (i.e., older mass spectrometer platforms). In a legacy embodiment, generally the RF voltage amplitude is set while the DC voltage is derived based on an RF amplitude analog measurement and a trim adjustment, which changes with mass, such as, for example, a Thermo Finnigan TSQ Quantum Quadrupole Mass Spectrometer. Thus, in a legacy embodiment, such as described above, that does not have digital RF measurement capabilities, the system may use the relatively well characterized nature of most resonant RF amplifier designs to assume some fixed group delay and/or other parameters to act as an estimate of the true RF output that appears on the quadrupole.

B. Peak Shape Recovery

Once the data pairs are obtained, the next step is to analyze/determine the peak width throughout every spectrum. In some embodiments, the spectra may not involve multiple charged ions or large mass defects, especially for peaks that are all less than 1 amu wide. Various methods to identify peaks and peak shapes of quadrupole mass filter scan data can be found in U.S. patent application Ser. No. 17/578,277, filed Jan. 18, 2022, and titled "Sparsity Based Data Centroider," and U.S. patent application Ser. No. 17/578,371, filed Jan. 18, 2022, and titled "Method for Tuning with Unresolved Peaks on Quadrupole Mass Spectrometers," the disclosure of each is incorporated herein by reference in its entirety.

In some embodiments, the system may formulate a peak shape recovery algorithm. The peak recovery algorithm may then target only sections of a spectrum that can be formulated as a circulant matrix problem without the need for permutation matrix operations that are currently required. By formulating the spectrum as a circulant matrix, the system can greatly reduce the computational complexity of peak shape recovery. This streamlining thus allows some embodiments to recover peak shapes throughout a spectrum at real time speeds, using standard processing devices.

In a particular embodiment, the system may recover the peak shape by first running a sparsity-based data centroider, such as described in U.S. patent application Ser. No. 17/578,277, disclosed above. Second, the system may identify one or more regions of interest and analyze them, as discussed herein, to recover the peak shape. By way of non-limiting example, the system may solve Equation 3 for the peak shape along the course of a scam by changing the centroid data that is used, where "A" is a circulant matrix that is defined by a column vector "a", where C matrix made up of the approximate peak shapes the system expects (e.g., based on an AI training set, or previous operations) and y is a vector with the estimated locations and intensities for all of the peaks that are not in the region, where column vector "a" is further defined as a variable vector "s" multiplied by a mask vector "m", where "m" is a vector with leading values equal to one (1) for as many units as the peak shape's recovered width may be (and 0 everywhere else), where "x" is a vector comprised of a selection of centroid data that the peak shape is recovered from, and where "b" is the detector data points (e.g., points aligned to a fixed interval gride based upon the RF or DC time spacing.

$$\min(\|Ax+Cx-b\|_2)\ s.t.\ [A\geq 0] \qquad \text{Equation 3:}$$

Thus, in some embodiments, the area of interest can be defined by the x vector. Specifically, non-zero values in the x vector may define where the algorithm will or should find a peak shape. Solving min(||Ax+Cy−b||) with the A≥0 constraint is better. The C term, although not required, may help analysis when the peaks that are not in the region of interest but may have overlap with our region of interest. Thus, in some embodiments, the system may utilize Equation 3 to solve for the peak shape along the course of a scan by changing/updating the centroid data that is used. In some embodiments, a sparsity centroider may provide improved accuracy in centroiding data, specifically when the peak shapes are within a factor of two (2) in width compared to what was expected. In a further embodiment, the system may also iteratively refine the shape by using the recovered shape to generate a new centroid list for the region of interest. Once the peak shape is recovered from a portion of a spectrum, the peak width may be measured.

In an additional embodiment, the system may utilize Equation 3 to produce a peak width curve that represents/shows how the peak width changes throughout a scan. It should be understood that any known or future methods for determining peak widths, such as, for example, spline fitting to discrete peak widths identified throughout the scan can be utilized for this step. Determining peak widths may require that the peak width does not change too rapidly. Thus, in some embodiments, the rate of change between the peak widths would need to be less than or equal to +−1 amu width change over approximately 5 amu of scan range.

C. Resolution-Transmission Curve

The final piece of information needed for the system is the resolution-transmission curve. As discussed herein, an initial calibration and/or tuning of the mass spectrometer is required prior to operation. Also as discussed herein, various data points are collected during calibration, such as, for example, RF amplitude data, DC amplitude data, detector data, etc. Based on these various data points, a resolution-transmission curve can be determined. In some embodiments, a resolution-transmission curve may allow the system to normalize the output results as a function of peak shape changes.

III. System Operation

Once all of the relevant information pieces (i.e., (1) initial tune and calibration data associated with how measured RF amplitudes correspond to given calibration ions of known mass; (2) RF amplitude measurements that correspond to all detector acquisition times; (3) peak widths throughout each individual scan; and (4) measured resolution-transmission curves for the calibration masses) have been collected, the system can then generate correct mass/intensity data pairs for the detected ions.

In some embodiments, the intensity data for a given result may be scaled by the inverse of what was measured on the resolution-transmission curve. However, determining the mass values requires a more involved correction. In some embodiments, the ion mass may be approximated based on the peak width change as a result of the DC field component changing, which may extend/enable transmission to happen at lower RF amplitudes with little impact to the cutoff on the high RF side of the peak. Although this approximation works in some embodiments, (i.e., those with small peak width changes) it may not work overall. Thus, in a further embodiment, the system may analyze the stability region shape for quadrupole mass filters.

Accordingly, in at least one embodiment, the system may approximate a stability line that a given ion species took through the stability diagram, based upon the peak width and the RF amplitude, assuming 0 RF amplitude corresponds to 0 mass. Thus, the system may need to utilize Equation 4 to determine approximately how far down from the tip of the stability diagram that the stability line passed for a given ion species. Based on the line, the system can tell how much the RF cutoff shifted compared to the initial calibration/system tune.

$$\frac{\{(\text{Transmission Stopping } RF) - (\text{Transmission Starting } RF)\}}{(\text{Transmission Stopping } RF)} \qquad \text{Equation 4}$$

In an alternative embodiment, the system may utilize a stability diagram peak shift estimate to characterize how mass position shifts as a function of peak width at various masses. In an embodiment where round rod quadrupoles are utilized, this experimental characterization may be more important than for more costly hyperbolic quadrupoles. The system may then utilize the peak width information, the sparsity centroider information, and RF amplitude data, to correct the mass information.

Figure 3:
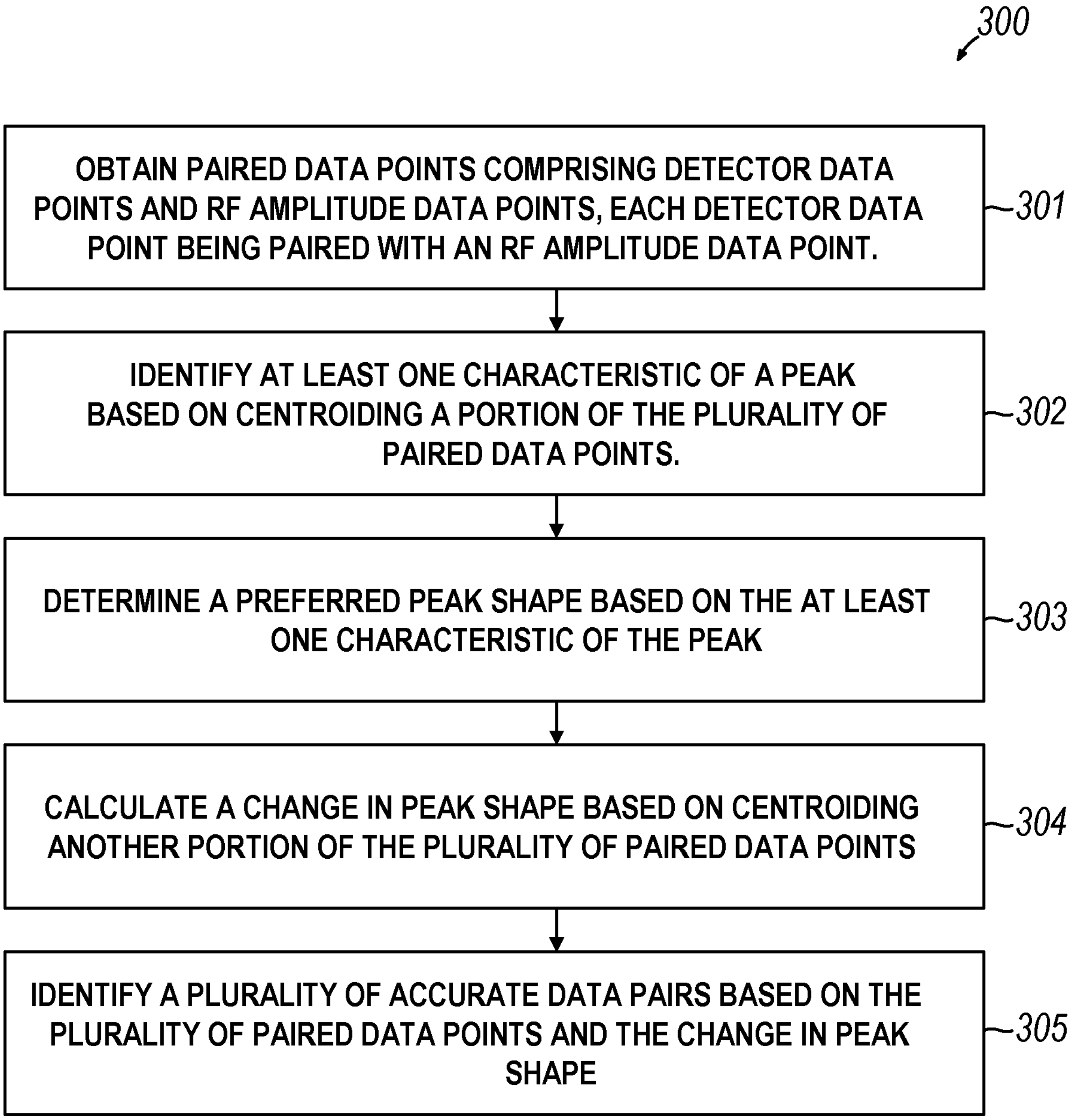
FIG. 3 is a flow diagram of an example method of improving mass spectrometer data, in accordance with various embodiments.

Referring now to FIG. 3, an example flowchart is shown in accordance with the systems and methods described herein may. In an embodiment, the system may obtain a plurality of paired data points (e.g., detector data points and RF amplitude data points), where each detector data point is paired with an RF amplitude data point 301. As discussed herein, the system may obtain the plurality of data points using various components/modules. Specifically, in some embodiments the system may utilize a digital RF closed loop control circuit to obtain and/or control the RF amplitude data points. Additional or alternative embodiments may utilize a digital RF measuring circuit to obtain the RF amplitude data points. In further embodiments, the system may also capture DC amplitude data point (i.e., using a digital RF closed loop control circuit and/or a digital RF measuring circuit).

Once the data points are obtained, the system may then identify at least one characteristic of a peak based on centroiding a portion of the plurality of paired data points 302. In some embodiments, the at least one characteristic of a peak may be a peak shape or a peak width. In a further embodiment, the system may also centroid any obtained DC amplitude data to aid in identifying the at least one characteristic.

Once all the characteristic(s) are obtained, the system may then determine a preferred peak shape based on the at least one characteristic of the peak 303. As discussed herein, determining a preferred peak shape can be accomplished in a variety of ways (e.g., using a circulant matrix, using a least squares regression analysis, using Equation 3, etc.). Once the peak shape is determined, the system may the calculate a change in peak shape based on centroiding another portion of the plurality of paired data points 304. Finally, based on the prior steps, the system may identify a plurality of accurate data pairs 305 based on the plurality of paired data points and the change in peak shape.

As discussed herein, additional information may be utilized to identify a plurality of accurate data pairs 305, such as, for example, utilizing a resolution-transmission curve. In some embodiments, the resolution-transmission curve may be crated based on a relationship between a measured RF (or DC) amplitude and an ion of known mass (e.g., those collected during initial calibration).

The mass spectrometer support methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The mass spectrometer support systems disclosed herein may include any suitable GUIs for interaction with a user.

IV. System Implementation

As noted above, the mass spectrometer platform 100 may be implemented by one or more computing devices. FIG. 5 is a block diagram of a computing device 4000 that may perform some or all of the mass spectrometer support methods disclosed herein, in accordance with various embodiments. In some embodiments, the mass spectrometer platform 100 may be implemented by a single computing device 4000 or by multiple computing devices 4000. Further, as discussed below, a computing device 4000 (or multiple computing devices 4000) that implements the mass spectrometer platform 100 may be part of one or more of the scientific instruments 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random-access memory (eDRAM) or spin transfer torque magnetic random-access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra-mobile personal computer, etc.), a desktop computing device, or a server computing device or other networked computing component.

One or more computing devices implementing any of the mass spectrometer support modules or methods disclosed herein may be part of a mass spectrometer support system. FIG. 5 is a block diagram of an example mass spectrometer support system 5000 in which some or all of the mass spectrometer support methods disclosed herein may be performed, in accordance with various embodiments. The mass spectrometer support modules and methods disclosed herein (e.g., the mass spectrometer platform 100 of FIG. 1 and the method 300 of FIG. 3) may be implemented by one or more of the scientific instruments 5010, the user local computing device 5020, the service local computing device 5030, or the remote computing device 5040 of the mass spectrometer support system 5000.

Any of the scientific instrument 5010, the user local computing device 5020, the service local computing device 5030, or the remote computing device 5040 may include any of the embodiments of the computing device 4000 discussed herein with reference to FIG. 4, and any of the scientific instrument 5010, the user local computing device 5020, the service local computing device 5030, or the remote computing device 5040 may take the form of any appropriate ones of the embodiments of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 4004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the mass spectrometer support system 5000 via communication pathways 5008. The communication pathways 5008 may communicatively couple the interface devices 5006 of different ones of the elements of the mass spectrometer support system 5000, as shown, and may be wired or wireless communication pathways (e.g., in accordance with any of the communication techniques discussed herein with reference to the interface devices 4006 of the computing device 4000 of FIG. 4). The particular mass spectrometer support system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as a gas chromatography mass spectrometer (GC-MS), a liquid chromatography mass spectrometer (LC-MS), ion chromatography mass spectrometer (IC-MS), or the like.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the mass spectrometer support system 5000 illustrated in FIG. 5 may not be present. Further, in some embodiments, multiple ones of various ones of the elements of the mass spectrometer support system 5000 of FIG. 5 may be present. For example, a mass spectrometer support system 5000 may include multiple user local computing devices 5020 (e.g., different user local computing devices 5020 associated with different users or in different locations). In another example, a mass spectrometer support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a mass spectrometer support system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a mass spectrometer support system 5000 may be different types of scientific instruments 5010. In some such embodiments, the remote computing device 5040 and/or the user local computing device 5020 may combine data from different types of scientific instruments 5010 included in a mass spectrometer support system 5000.

What is claimed is:

1. A mass spectrometer support apparatus, comprising:

a processor;

a non-transitory computer readable medium storing instructions that cause the processor to perform a set of acts comprising:

obtaining, with a detector, detector data points based on ions from an ion source;

obtaining a plurality of paired data points comprising the detector data points and RF amplitude data points, each detector data point being paired with an RF amplitude data point;

identifying, based on centroiding a portion of the plurality of paired data points, at least one characteristic of a peak;

determining, based on the at least one characteristic of the peak, a preferred peak shape;

calculating, based on centroiding another portion of the plurality of paired data points, a change in peak shape; and identifying, based on the plurality of paired data points and the change in peak shape, a plurality of accurate data pairs.

2. The mass spectrometer support apparatus of claim 1, further comprising a digital RF closed loop control circuit, wherein the RF amplitude data points are obtained via the digital RF closed loop control circuit.

3. The mass spectrometer support apparatus of claim 1, further comprising a digital RF measuring circuit, wherein the RF amplitude data points are obtained via the digital RF measuring circuit.

4. The mass spectrometer support apparatus of claim 1, wherein the at least one characteristic of the peak comprises at least one of: a peak shape and a peak width.

5. The mass spectrometer support apparatus of claim 1, wherein the instructions further cause the processor to:

determine, based on a calibration of the mass spectrometer support apparatus, a relationship between a measured RF amplitude and an ion of known mass.

6. The mass spectrometer support apparatus of claim 5, wherein the instructions further cause the processor to create, based on the relationship between the measured RF amplitude and the ion of known mass calibration, a resolution-transmission curve.

7. The mass spectrometer support apparatus of claim 6, wherein identifying the plurality of accurate data pairs is further based on the resolution-transmission curve.

8. The mass spectrometer support apparatus of claim 1, wherein the instructions further cause the processor to:

obtain a plurality of DC amplitude data points, wherein each of the plurality of DC amplitude data points is paired with a corresponding RF amplitude data point.

9. The mass spectrometer support apparatus of claim 8, wherein identifying at least one characteristic of a peak is further based on centroiding the plurality of DC amplitude data points.

10. The mass spectrometer support apparatus of claim 1, wherein determining the preferred peak shape further comprises using at least one of: a circulant matrix, a convolution operation, or a least squares regression analysis.

11. A method comprising:

obtaining detector data points based on ions from an ion source;

obtaining a plurality of paired data points comprising the detector data points and RF amplitude data points, each detector data point being paired with an RF amplitude data point;

identifying, based on centroiding a portion of the plurality of paired data points, at least one characteristic of a peak;

determining, based on the at least one characteristic of the peak, a preferred peak shape; calculating, based on centroiding another portion of the plurality of paired data points, a change in peak shape; and identifying, based on the plurality of paired data points and the change in peak shape, a plurality of accurate data pairs.

12. The method of claim 11, further comprising a digital RF closed loop control circuit, wherein the RF amplitude data points are obtained via the digital RF closed loop control circuit.

13. The method of claim 11, further comprising a digital RF measuring circuit, wherein the RF amplitude data points are obtained via the digital RF measuring circuit.

14. The method of claim 11, wherein the at least one characteristic of the peak comprises at least one of: a peak shape and a peak width.

15. The method of claim 11, further comprising determining, based on calibrating a mass spectrometer support apparatus, a correlation between a measured RF amplitude and an ion of known mass.

16. The method of claim 15, further comprising creating, based on the correlation between the measured RF amplitude and the ion of known mass calibration, a resolution-transmission curve.

17. The method of claim 16, wherein identifying the plurality of accurate data pairs is further based on the resolution-transmission curve.

18. The method of claim 11, further comprising obtaining a plurality of DC amplitude data points, wherein each of the plurality of DC amplitude data points is paired with a corresponding RF amplitude data point.

19. The method of claim 18, wherein identifying at least one characteristic of a peak is further based on centroiding the plurality of DC amplitude data points.

20. The method of claim 11, wherein determining the preferred peak shape further comprises using at least one of: a circulant matrix, a convolution operation, or a least squares regression analysis.

21. A mass spectrometer support apparatus, comprising:

a multipole configured to pass an ion stream, the ion stream comprising an abundance of one or more ion species within stability boundaries defined by (a, q) values;

a detector configured to detect data points representing properties of the abundance of one or more ion species; and a processing system configured to obtain a plurality of paired data points comprising detector data points and RF amplitude data points, each detector data point being paired with an RF amplitude data point, the processing system further configured to identify, based on centroiding a portion of the plurality of paired data points, at least one characteristic of a peak and determine, based on the at least one characteristic of the peak, a preferred peak shape, wherein the processing system is further configured to calculate, based on centroiding another portion of the plurality of paired data points, a change in peak shape and identify, based on the plurality of paired data points and the change in peak shape, a plurality of accurate data pairs.

22. The mass spectrometer support apparatus of claim 21, further comprising an RF control circuit and wherein the RF amplitude data points are obtained via the RF control circuit.

23. The mass spectrometer support apparatus of claim 21, wherein the at least one characteristic of the peak comprises at least one of: a peak shape and a peak width.

24. The mass spectrometer support apparatus of claim 21, wherein the processing system is further configured to determine, based on a calibration of the mass spectrometer support apparatus, a correlation between a measured RF amplitude and an ion of known mass.

* * * * *